(12) United States Patent
Minamoto

(10) Patent No.: US 8,681,877 B2
(45) Date of Patent: Mar. 25, 2014

(54) DECODING APPARATUS, DECODING CONTROL APPARATUS, DECODING METHOD, AND PROGRAM

(75) Inventor: Junichi Minamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 612 days.

(21) Appl. No.: 12/821,232

(22) Filed: Jun. 23, 2010

(65) Prior Publication Data

US 2010/0329357 A1 Dec. 30, 2010

(30) Foreign Application Priority Data

Jun. 29, 2009 (JP) ................................ P2009-153124
Nov. 11, 2009 (JP) ................................ P2009-257603

(51) Int. Cl.
*H04N 7/12* (2006.01)
*H04N 11/02* (2006.01)
*H04N 11/04* (2006.01)

(52) U.S. Cl.
USPC .................................................. 375/240.25

(58) Field of Classification Search
USPC ................. 375/240, 240.01–240.27
See application file for complete search history.

(56) References Cited

U.S. PATENT DOCUMENTS

| 5,748,795 A * | 5/1998 | Ohnishi et al. ................ 382/251 |
| 6,343,097 B2 * | 1/2002 | Kobayashi et al. ........... 375/240 |
| 2006/0171458 A1 * | 8/2006 | Feng et al. ............... 375/240.03 |
| 2006/0206733 A1 * | 9/2006 | Ono ............................. 713/300 |
| 2007/0223833 A1 * | 9/2007 | Park et al. .................... 382/260 |
| 2008/0089417 A1 * | 4/2008 | Bao et al. ................ 375/240.16 |

FOREIGN PATENT DOCUMENTS

JP 2007 13398 1/2007

* cited by examiner

*Primary Examiner* — Andy Rao
*Assistant Examiner* — Jared Walker
(74) *Attorney, Agent, or Firm* — Frommer Lawrence & Haug LLP; William S. Frommer; Ellen Marcie Emas

(57) ABSTRACT

A decoding apparatus is disclosed which includes: a decoding information acquisition block acquiring decoding information necessary for decoding in units of a macro block from coded data; a decoding block decoding the coded data into decoded data based on the decoding information; a quantization noise filter block performing a noise reduction process on the decoded data for reducing a predetermined quantization noise per macro block; a quantization noise occurrence indicator generation block generating, based on the decoding information, a noise occurrence indicator indicative of the predetermined quantization noise in a manner reflecting a coded state of each of the blocks constituting the macro block; and a parameter setting block setting parameters for the quantization noise filter block based on the noise occurrence indicator.

14 Claims, 17 Drawing Sheets

| macroblock(){ | BIT COUNT |
|---|---|
| while(nextbits()=='0000 0001 000') | |
| macroblock_escape | 11 |
| macroblock_address_increment | 1-11 |
| macroblock_modes() | |
| if(macroblock_quant) | |
| quantiser_scale_code | 5 |
| if(macroblock_motion_forward \|\| | |
| (macroblock_intra && concealment_motion_vectors)) | |
| motion_vectors(0) | |
| if(macroblock_motion_backward) | |
| motion_vectors(1) | |
| if(macroblock_intra && concealment_motion_vectors) | |
| marker_bit | 1 |
| if(macroblock_pattern) | |
| coded_block_pattern() | |
| for(i=0; i<block_count; i++){ | |
| block(i) | |
| } | |
| } | |

FIG.7

| coded_block_pattern (){ | BIT COUNT |
|---|---|
|    coded_block_pattern_420 | 3-9 |
|   if( chroma_format ==4:2:2 ) | |
|      coded_block_pattern_1 | 2 |
|   if( chroma_format ==4:4:4 ) | |
|      coded_block_pattern_2 | 6 |
| } | |

CODE AMOUNT

| CODE AMOUNT LARGE | CODE AMOUNT LARGE |
|---|---|
| CODE AMOUNT SMALL | CODE AMOUNT SMALL |

CODED BLOCK PATTERN

| CODED | CODED |
|---|---|
| UNCODED | UNCODED |

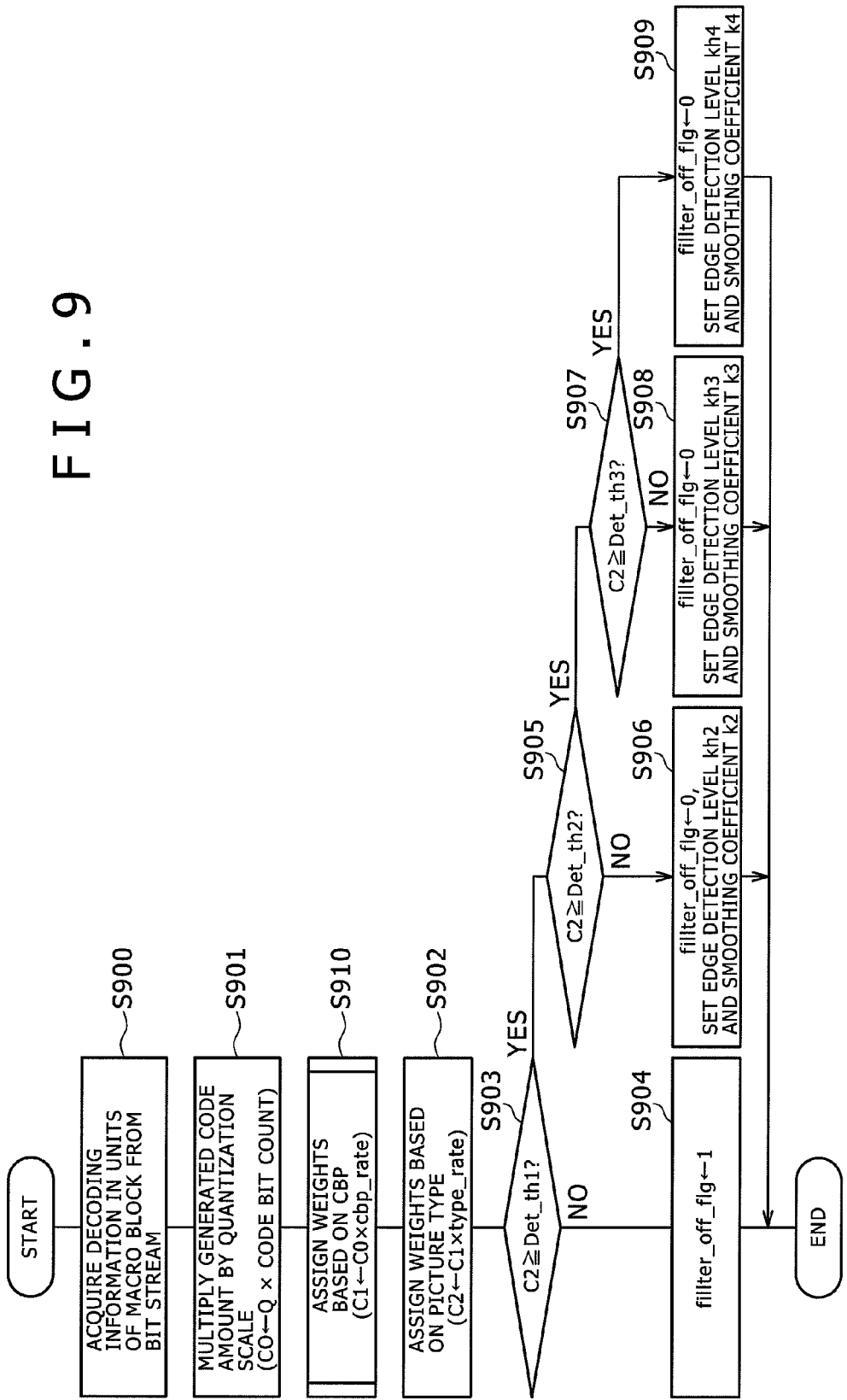

DECODING APPARATUS, DECODING CONTROL APPARATUS, DECODING METHOD, AND PROGRAM

BACKGROUND OF THE INVENTION

1. Field of the Invention

The present invention relates to a decoding apparatus for decoding coded data. More particularly, the invention relates to a decoding apparatus, a decoding control apparatus, and a decoding method for performing a noise reduction process upon decoding, as well as a program for causing a computer to execute the decoding method.

2. Description of the Related Art

There exist video compression coding schemes which, in digitally compressing a video signal, regard a plurality of pixels of the target video signal positioned horizontally and vertically contiguous to one another as one rectangular block and enable compression coding to be performed in units of that block. Such video compression coding schemes include standards such as MPEG-2 and H.264/AVC. The video signal compression-coded in units of the above-mentioned rectangular block by one of these compression coding schemes is decoded also in units of the block, whereby the original video signal is restored. According to MPEG-2, for example, the video data constituting the video signal is split into macro blocks each composed of eight lines by eight pixels amounting to 64 pixels. The video data is subjected to orthogonal transformation such as discrete cosine transform (DCT) in unit of such a macro block. The video data is thus transformed into frequency components (DCT coefficients) which are coded to compress the video data.

The compression coding and decoding schemes outlined above reduce code amount by significantly abbreviating radio frequency components when performing the step of quantizing the coefficient values following orthogonal transformation, thereby enhancing coding efficiency (compression rate). However, if the step of quantization is reinforced excessively, the quantization error stemming from the abbreviated radio frequency components may degrade image quality in the decoded video data.

In connection with image quality degradation, so-called mosquito noise or ringing noise is known to appear particularly on the periphery of an image edge, the noise being dispersed around the edge. The mosquito noise is generated by lack of information near the edge due to reductions of radio frequency components in the quantization process. Electronic information devices (e.g., see Japanese Patent Laid-Open No. 2007-13398, FIG. 1) have been proposed to remove such mosquito noise. The proposed devices illustratively have a post-filter for digital video processing positioned downstream of the decoder.

SUMMARY OF THE INVENTION

According to the ordinary techniques mentioned above, quantization parameters are acquired per macro block. A mosquito noise elimination process is performed only on those macro blocks with their quantization parameters found larger than a quantization threshold value. However, if the need for noise removal is determined in units of a macro block as with the ordinary techniques, there is a possibility that no mosquito noise will be detected if the noise is concentrated on very limited blocks within the macro block. On the other hand, if the threshold value is set in such a manner as to permit easier detection of mosquito noise, the noise might be detected too often.

If the post-filter is positioned downstream of the decoder as in the ordinary setup, there needs to be a buffer interconnecting these two components. That is because decoding is performed in units of a macro block while display processing involves scanning in units of a line, so that an extra buffer is needed to retain the pixel information needed in these two stages.

The present invention has been made in view of the above circumstances and provides a decoding apparatus, a decoding control apparatus, a decoding method, and a program which, upon reducing quantization noise such as mosquito noise using a filter arrangement, allow filter parameters to be set in a manner reflecting a coded state of each of the blocks constituting each macro block.

In carrying out the present invention and according to one embodiment thereof, there is provided a decoding apparatus including: a decoding information acquisition block configured to acquire decoding information necessary for decoding in units of a macro block from coded data; a decoding block configured to decode the coded data into decoded data based on the decoding information. The decoding apparatus further includes: a n noise filter block configured to perform a noise reduction process on the decoded data for reducing a predetermined quantization noise per macro block; a quantization noise occurrence indicator generation block configured to generate, based on the decoding information, a noise occurrence indicator indicative of the predetermined quantization noise in a manner reflecting a coded state of each of the blocks constituting the macro block; and a parameter setting block configured to set parameters for the quantization noise filter block based on the noise occurrence indicator. According to another embodiment of the present invention, there is provided a decoding method representing the functionality of the above-outlined decoding apparatus, as well as a program equivalent to the decoding method. These embodiments provide the effect of executing the process for reducing the quantization noise in keeping with the coded state of each block in the macro block.

Preferably, the quantization noise occurrence indicator generation block may generate the noise occurrence indicator by use of coded block pattern information (coded_block_pattern( )) found in the decoding information and indicating whether each of the blocks is coded.

Preferably, the quantization noise occurrence indicator generation block may acquire, from the coded block pattern information, the number of coded blocks within the macro block and generate the noise occurrence indicator based on the acquired number of the coded blocks. Preferably, the quantization noise occurrence indicator generation block may acquire, from the coded block pattern information, the number of coded blocks within the macro block for each of brightness and color difference components and generate the noise occurrence indicator based on the acquired number of the coded blocks for each of the brightness and color difference components. Where the number of the coded blocks is acquired for each of the brightness and color difference components involved, it is possible to generate the noise occurrence indicator more flexibly every time these factors are changed. If the number of the coded blocks is acquired without distinction of brightness or color difference components, the process for generating the noise occurrence indicator may be that much simplified.

Preferably, the quantization noise occurrence indicator generation block may generate the noise occurrence indicator by use of the number obtained by first multiplying a generated code amount by a quantization scale found in the decoding information and by further weighting the product of the multiplication based on the coded block pattern information. In this case, the quantization noise occurrence indicator generation block may preferably generate the noise occurrence indicator by use of the number obtained by first weighting the product of the multiplication based on the coded block pattern information and by further weighting the weighted product based on a picture type found in the decoding information.

Preferably, the parameter setting block may set the parameters in such a manner that the larger the noise occurrence indicator, the more reinforced the noise reduction process to be performed by the quantization noise filter block.

Preferably, the decoding apparatus of the present invention may further include an edge detection block configured to detect an edge image included in the decoded data; wherein the quantization noise filter block may not perform the noise reproduction process on the macro block from which the edge image is detected by the edge detection block. This structure provides the effect of not performing the noise reduction process on the macro block from which the edge image is detected, even if the need to perform the noise reduction process is not apparent judging from the encoded state of each block.

Preferably, the parameter setting block may set the parameters based on motion information found in the decoding information and on the noise occurrence indicator generated by the quantization noise occurrence indicator generation block. This structure provides the effect of carrying out the process for reducing the quantization noise by additionally taking the motion information into consideration. In this case, the parameter setting block may preferably set the parameters in such a manner that the larger the motion represented by the motion information, the more reinforced the noise reduction process to be performed by the quantization noise filter block.

Preferably, the predetermined quantization noise may be mosquito noise, and the quantization noise filter block may perform a smoothing process as the noise reduction process for reducing the mosquito noise.

Preferably, the noise occurrence indicator may be an indicator indicative of the presence of either subtitles or telop characters in an image; and the quantization noise filter block may perform a smoothing process as the noise reproduction process for reducing the noise in an image area where either the subtitles or the telop characters are present.

According to another embodiment of the present invention, there is provided a decoding control apparatus including: a decoding information acquisition block configured to acquire decoding information necessary for decoding in units of a macro block from coded data; a quantization noise occurrence indicator generation block configured to generate, based on the decoding information, a noise occurrence indicator indicative of a predetermined quantization noise in a manner reflecting a coded state of each of the blocks constituting the macro block; and a parameter generation block configured to generate, based on the noise occurrence indicator, parameters for use in a noise reduction process for reducing the predetermined quantization noise. According to a further embodiment of the present invention, there is provided a decoding control method representing the functionality of the above-outlined decoding control apparatus, as well as a program equivalent to the decoding method. These embodiments provide the effect of controlling the process for reducing the quantization noise in keeping with the coded state of each code within the macro block.

As outlined above, where quantization noise such as mosquito noise is to be reduced using a filter arrangement, the present invention provides the advantage of setting the filter parameters by taking into account the coded state of each of the blocks within each macro block.

BRIEF DESCRIPTION OF THE DRAWINGS

FIG. 6 is a tabular view showing a syntax of a macro block defined by MPEG-2;

FIG. 7 is a tabular view showing a syntax of coded block pattern information (coded_block_pattern( )) defined by MPEG-2;

FIG. 9 is a flowchart of steps constituting an operation example in which the decoding apparatus as a first embodiment of the invention sets parameters;

DETAILED DESCRIPTION OF THE PREFERRED EMBODIMENTS

Some preferred embodiments (simply called the embodiment or embodiments hereunder) of the present invention will now be described in reference to the accompanying drawings. The description will be given under the following headings:

1. First embodiment (an example in which the filter parameters are set based on the quantization noise occurrence indicator)
2. Second embodiment (an example in which the filter parameters are set based on the quantization noise occurrence indicator supplemented with motion information)
3. Variations 1. First Embodiment Typical Circuit Structure of the Decoding Apparatus 100

Figure 1:
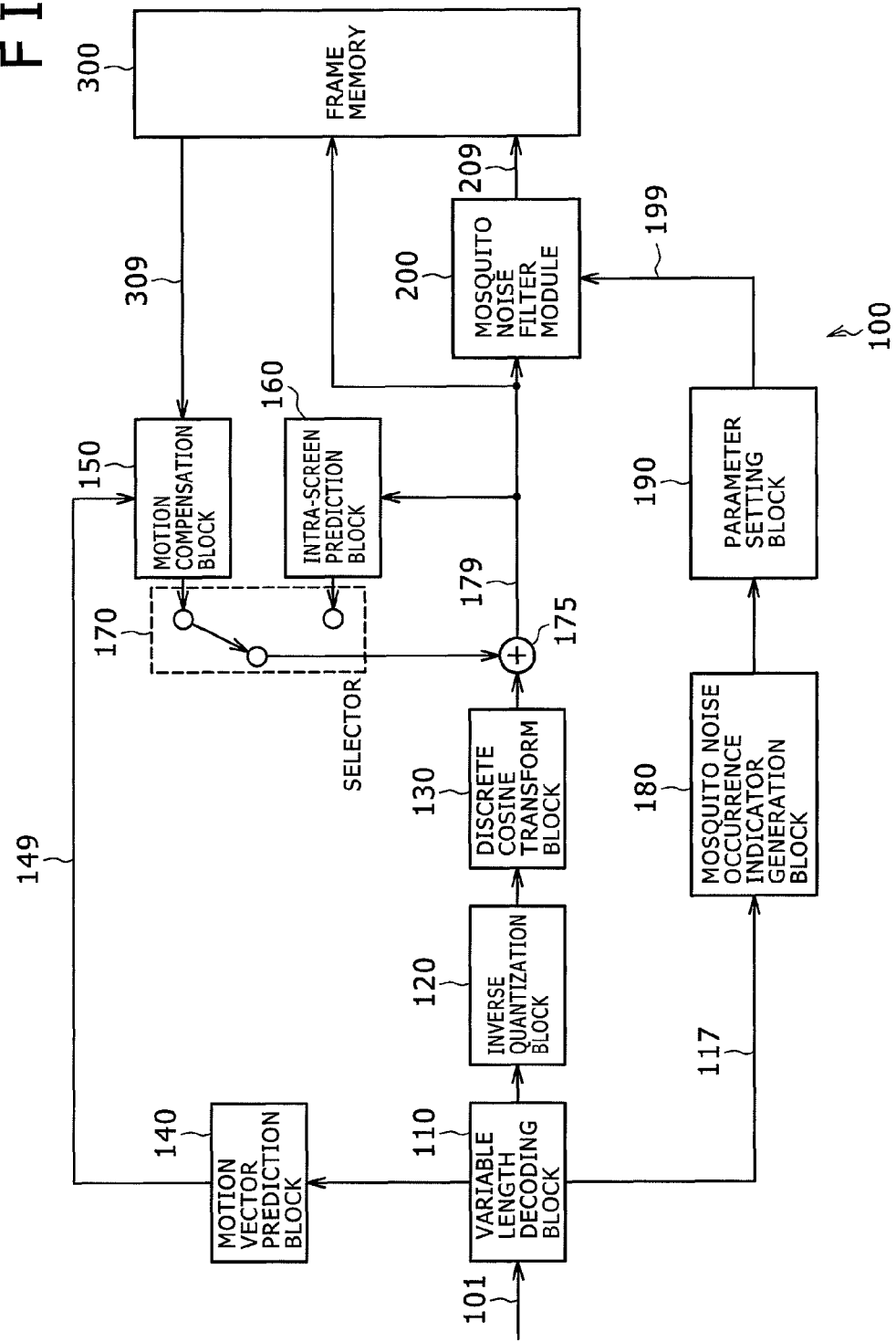
FIG. 1 is a block diagram showing a typical circuit structure of a decoding apparatus as one embodiment of the present invention.

FIG. 1 is a block diagram showing a typical circuit structure of a decoding apparatus 100 as one embodiment of the present invention. The decoding apparatus 100 is assumed to perform a decoding process on data coded according to MPEG-2 (Moving Picture Experts Group Phase 2). The decoding apparatus 100 includes a variable length decoding block 110, an inverse quantization block 120, a discrete cosine transform block 130, a motion vector prediction block 140, a motion compensation block 150, an intra-screen prediction block 160, a selector 170, an adder 175, and a frame memory 300. Unlike ordinary decoding apparatuses according to MPEG-2, the decoding apparatus 100 further includes a mosquito noise occurrence indicator generation block 180, a parameter setting block 190, and a mosquito noise filter module 200.

The variable length decoding block 110 decodes data coded in variable length code (VLC). According to MPEG-2 and other standards, data is coded in variable length code (entropy coded) based on the Huffman code and by use of biased probabilities of noise occurrence upon coding through motion-compensated inter-frame prediction or discrete cosine transform. By decoding coded data in variable length code, the variable length decoding block 110 generates decoding information necessary for decoding macro blocks. The decoding information generated by the variable length decoding block 110 is supplied to the inverse quantization block 120, motion vector prediction block 140, and mosquito noise occurrence indicator generation block 180.

The inverse quantization block 120 inversely quantizes the data decoded in variable length code so as to generate DC and AC components of a DCT coefficient. The discrete cosine transform block 130 generates video data by performing discrete cosine transform on the DC and AC components of the DCT coefficient inversely quantized by the inverse quantization block 120. The motion vector prediction block 140 predicts a motion vector from the information about motion vectors in the data decoded in variable length code, and outputs the predicted motion vector onto a signal line 149. The motion compensation block 150 generates video data by performing inter-screen motion compensation based on the motion vector predicted by the motion vector prediction block 140 and on frame data held in the frame memory 300. The intra-screen prediction block 160 generates video data by performing intra-screen prediction. The selector 170 selects either the video data generated by the motion compensation block 150 or the video data generated by the intra-screen prediction block 160. The adder 175 combines (i.e., adds up) the video data generated by the discrete cosine transform block 130 and the video data selector 170, and outputs the composite video data onto a signal line 179. These processes are carried out in units of a macro block.

Based on the decoding information generated by the variable length decoding block 110, the mosquito noise occurrence indicator generation block 180 generates a noise occurrence indicator indicative of mosquito noise in a manner reflecting a coded state of each of the blocks within the macro block. A specific method for generating the noise occurrence indicator will be explained later. In particular, a quantization scale, a generated code amount, coded block pattern information, and a picture type found in the decoding information may be used to generate the noise occurrence indicator. Incidentally, the mosquito noise occurrence indicator generation block 180 is an example of the quantization noise occurrence indicator generation block claimed in the appended claims.

The parameter setting block 190 sets parameters for the mosquito noise filter module 200 via a signal line 199 based on the mosquito noise occurrence indicator generated by the mosquito noise occurrence indicator generation block 180. A specific method for setting the parameters will be discussed later. The parameters will be set in such a manner that the larger the mosquito noise occurrence indicator, the more reinforced the noise reduction process to be performed by the mosquito noise filter module 200.

The mosquito noise filter module 200 performs a mosquito noise reduction process on the video data output onto the signal line 179. The parameters for the noise reduction process are set by the parameter setting block 190. The video data processed by the mosquito noise filter module 200 is sent to the frame memory 300 via a signal line 209 and retained in the memory 300.

The frame memory 300 holds either the video data composed by the adder 175 or the video data processed by the mosquito noise filter module 200. The video data retained in the frame memory 300 is referenced by the motion compensation block 150 via a signal line 309.

Incidentally, the variable length decoding block 110 is an example of the decoding information acquisition block claimed in the appended claims. The inverse quantization block 120, discrete cosine transform block 130, motion vector prediction block 140, motion compensation block 150, intra-screen prediction block 160, selector 170, adder 175, and frame memory 300 constitute an example of the decoding block claimed in the appended claims. The mosquito noise filter module 200 is an example of the quantization noise filter block claimed in the appended claims.

[Typical Circuit Structure of the Mosquito Noise Filter Module 200]

Figure 2:
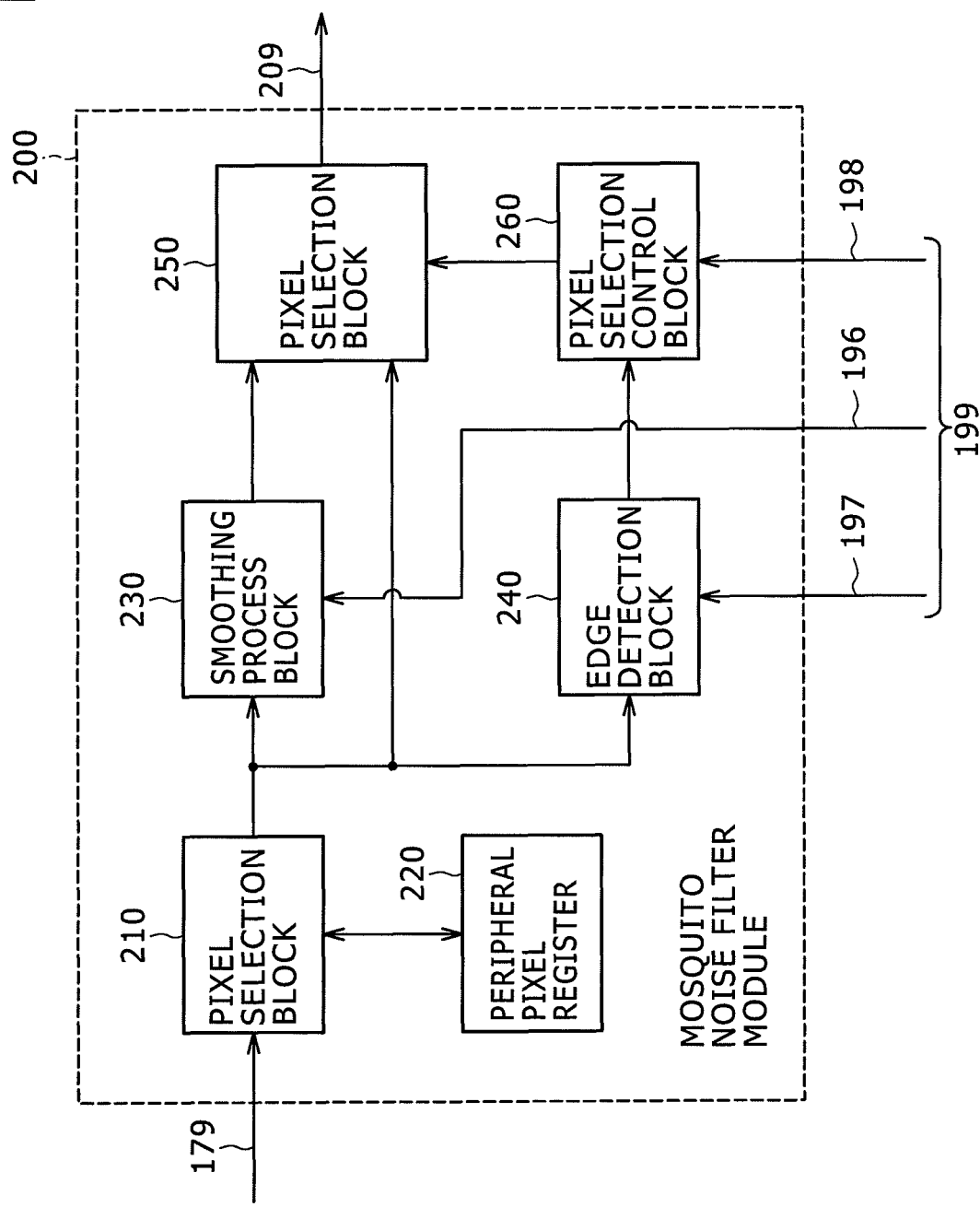
FIG. 2 is a block diagram showing a typical circuit structure of a mosquito noise filter module in the embodiment.

FIG. 2 is a block diagram showing a typical circuit structure of the mosquito noise filter module 200 in the embodiment of this invention. The mosquito noise filter module 200 includes a pixel selection block 210, a peripheral pixel register 220, a smoothing process block 230, an edge detection block 240, a pixel selection block 250, and a pixel selection control block 260.

The pixel selection block 210 acquires per macro block the video data input through the signal line 179, places the input video data in the peripheral pixel register 220, and selects pixel data necessary for processing from the video data held in the peripheral pixel register 220. Illustratively, the pixel data selected by the pixel selection block 210 is made up of three lines by three pixels amounting to nine pixels. The peripheral pixel register 220 holds the video data acquired per macro block by the pixel selection block 210. The video data retained in the peripheral pixel register 220 is used again by the pixel selection block 210.

The smoothing process block 230 performs a smoothing process for reducing mosquito noise in the pixel data selected by the pixel selection block 210. A smoothing coefficient for use by the smoothing process block 230 is set by the parameter setting block 190 via a signal line 196 included in the signal line 199.

The edge detection block 240 detects an edge image included in the pixel data selected by the pixel selection block 210. An edge detection level for use by the edge detection block 240 is set by the parameter setting block 190 via a signal line 197 included in the signal line 199.

The pixel selection block 250 selects either the pixel data smoothed by the smoothing process block 230 or unsmoothed pixel data, and outputs the selected pixel data onto the signal line 209. The pixel selection control block 260 controls the pixel selection block 250 to select the pixel data. Specifically, the pixel selection control block 260 controls the pixel selection block 250 to select the unsmoothed pixel data given a macro block in which an edge is detected by the edge detection block 240. Also, by way of a signal line 198 included in the signal line 199, the pixel selection control block 260 controls the pixel selection block 250 in accordance with what is being set by the parameter setting block 190. That is, if the mosquito noise occurrence indicator is found to be smaller than a predetermined threshold value, the pixel selection control block 260 controls the pixel selection block 250 to select the unsmoothed pixel data regarding the macro block having the edge detected therein.

[Data Structure Defined by MPEG-2]

Figure 3:
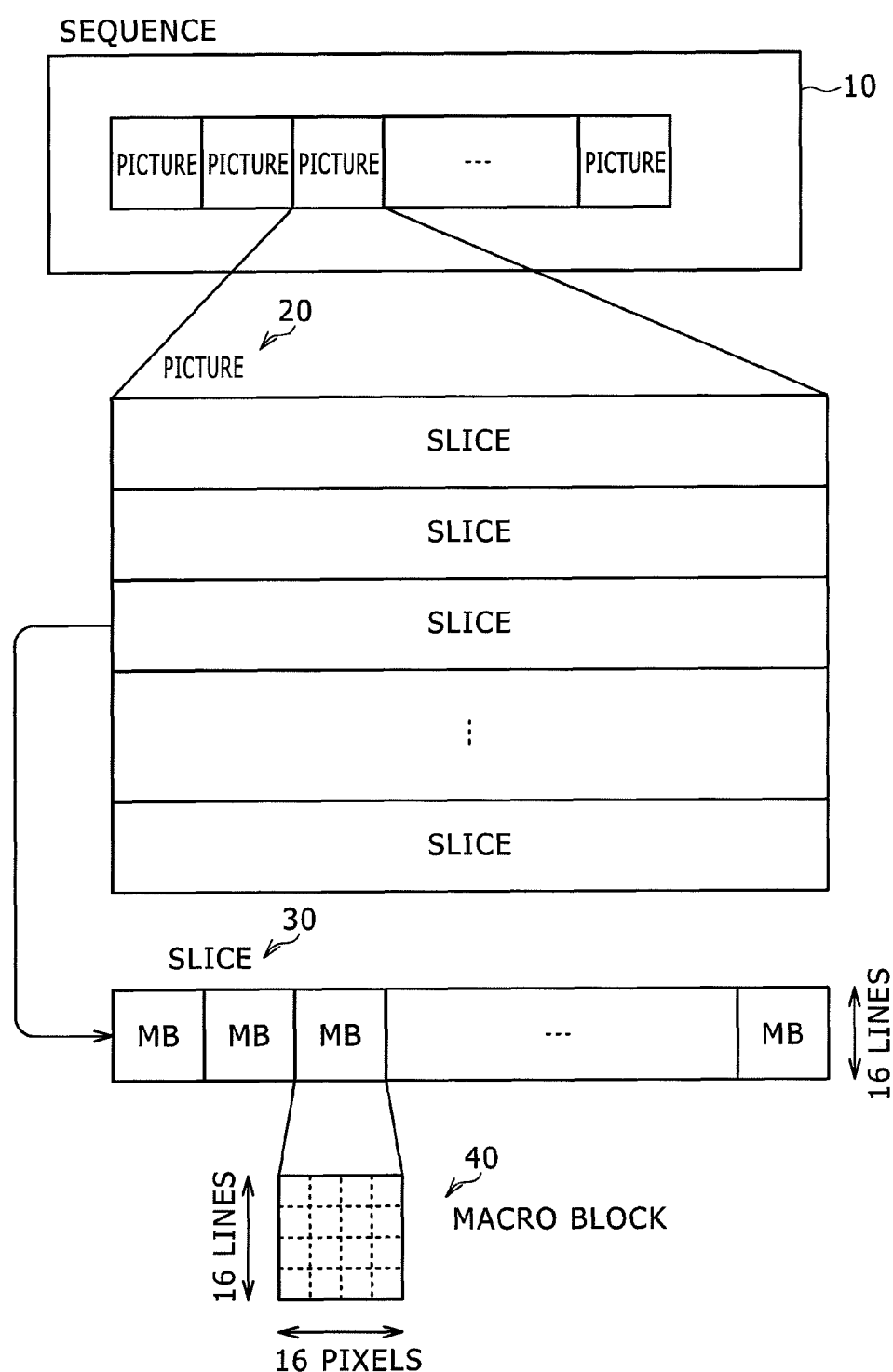
FIG. 3 is a schematic view outlining a data structure defined by MPEG-2.

FIG. 3 is a schematic view outlining the data structure defined by MPEG-2. According to MPEG-2, data columns of coded data are each divided primarily into four layers: sequence layer, picture layer, slice layer, and macro block layer.

Each picture 20 included in the sequence layer represents a single image. The picture 20 is split into a plurality of slices 30. The slices 30 are formed by dividing the picture 20 into bands of 16 lines each.

Each slice 30 is composed of a plurality of macro blocks 40. The macro blocks 40 each constitute picture data corresponding to an area of 16 lines by 16 pixels on the screen. Each macro block 40 is further divided into blocks of eight lines by eight pixels, each of the blocks serving as the processing unit of DCT.

[Typical Process Performed by the Smoothing Process Block 230]

Figure 4:
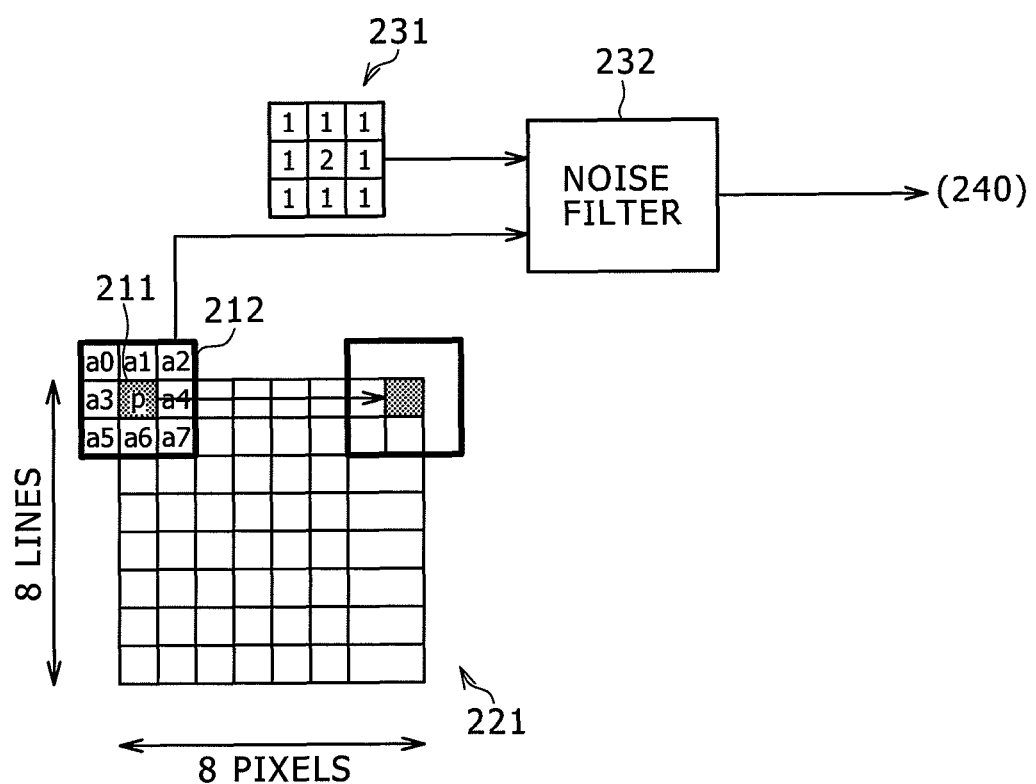
FIG. 4 is a schematic view showing a typical process performed by a smoothing process block in the embodiment.

FIG. 4 is a schematic view showing a typical process performed by the smoothing process block 230 in the embodiment of this invention. The smoothing process block 230 includes a noise filter 232 that performs the smoothing process for reducing noise in accordance with a smoothing coefficient 231 set by the parameter setting block 190. The noise filter 232 is implemented illustratively by a 3-by-3 two-dimensional FIR filter. In the smoothing process, each of the pixels in a block 221 made up of eight lines by eight pixels serves as a target pixel 211. Typically, nine pixels composed of three lines by three pixels including peripheral pixels 212 around the target pixel 211 are referenced during the process. The pixel selection block 210 thus selects these nine pixels and supplies them to the smoothing process block 230. Although the smoothing process is described herein as being performed in units of the block of eight lines by eight pixels, this is not limitative of the present invention. Alternatively, the smoothing process may be carried out in units of a macro block of 16 lines by 16 pixels.

After completing the smoothing process on the top left pixel as the target pixel in the block 221, the smoothing process block 230 moves to the next target pixel located immediately on the right for more processing. The smoothing process block 230 moves likewise to the right until the rightmost pixel is reached. After processing the rightmost pixel as the target pixel, the smoothing process block 230 moves to the leftmost pixel one line below. When the smoothing process is performed likewise and completed on the right bottom pixel as the target pixel, the smoothing process on the block 221 in question is finished.

Upon smoothing process, there may not exist peripheral pixels around the block 221 as illustrated in FIG. 4. In such a case, necessary peripheral pixels may be interpolated from the pixel values on the periphery of the block 221. Illustratively, adjacent pixel values may be utilized unmodified. Alternatively, two or three adjacent pixels may be calculated so as to find a weighted average.

While the reference pixels for the smoothing process block 230 were explained above, the reference pixels for the edge detection block 240 may also be handled likewise.

[Content of the Coded Block Pattern Information]

Figure 5A:
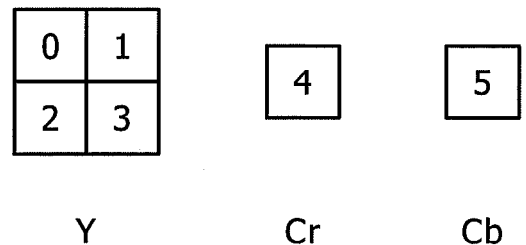
FIGS. 5A, 5B and 5C are schematic views showing content of coded block pattern information for use by the embodiment.
Figure 5B:
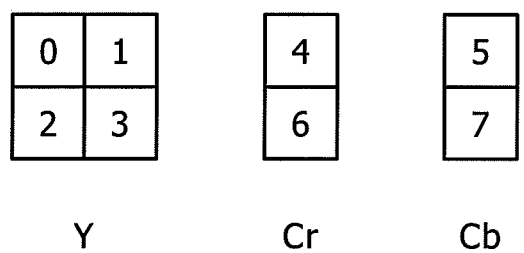
Figure 5C:
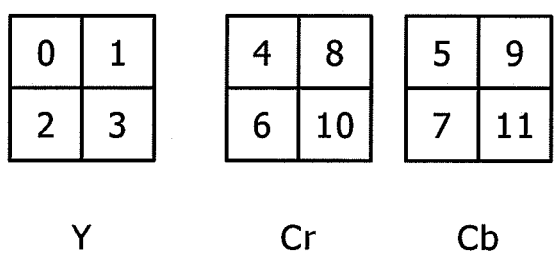

FIGS. 5A, 5B and 5C are schematic views showing content of the coded block pattern information for use by the embodiment of this invention. The coded block pattern information (coded_block_pattern), used as defined by MPEG-2, indicates whether or not each of the blocks within each macro block is coded. Under MPEG-2, video data is expressed by brightness (Y) and color difference (Cr and Cb) components. In accordance with the rates of the sampling frequencies for these components, three formats are stipulated: 4:2:0, 4:2:2 and 4:4:4.

That is, where each macro block is viewed as the unit, the 4:2:2 format involves four components of brightness Y, two components of color difference Cr, and two components of color difference Cb as shown in FIG. 5B. With the macro block viewed as the unit, the 4:4:4 format involves four components of brightness Y, four components of color difference Cr, and four components of color difference Cb as shown in FIG. 5C. In the 4:2:0 format, the 4:2:0 and 4:0:2 formats alternate in odd-numbered and even-numbered lines. When each macro block is viewed as the unit, the 4:2:0 format involves four components of brightness Y, one component of color difference Cr, and one component of color difference Cb as shown in FIG. 5A.

[Macro Block Syntax]

FIG. 6 is a tabular view showing a macro block syntax defined by MPEG-2. As explained above in reference to FIG. 3, macro blocks constitute a slice. Each macro block contains six blocks.

In the syntax, "macroblock_escape" is fixed to a value of "00000001000" and used when the difference from the immediately preceding macro block address is larger than "33." "macroblock_address_increment" denotes the difference from the immediately preceding macro block address. "macroblock_modes( )" indicates a coding mode of the macro block. "quantiser_scale_code" represents a quantization step size for the macro block. "motion_vectors(0)" and "motion_vectors(1)" denote information regarding forward and backward reference motion vectors respectively. "marker_bit" is the bit value "1" for use in alignment.

"coded_block_pattern( )" is coded block pattern information indicating whether the blocks in the macro block are coded. Details of the coded block pattern information will be explained below in reference to FIG. 7. "block(i)" is information about the blocks in the macro block.

[Syntax of the Coded Block Pattern Information]

FIG. 7 is a tabular view showing a syntax of the coded block pattern information (i.e., coded_block_pattern( )) defined by MPEG-2. The coded block pattern information varies in content depending on which of the three formats discussed above is in effect. In the case of the 4:2:0 format, the coded block pattern information is "coded_block_pattern_420." The information "coded_block_pattern_420" is coded in variable length code and has a bit width ranging from three to nine bits. The bit pattern subsequent to the decoding in variable length code is six bits wide. From the LSB on as shown in FIG. 5A, one bit is allotted to each of the top left block, top right block, bottom left block, and bottom right block of brightness Y; to color difference Cr, and to color difference Cb, in that order. If the allotted bit is "1," that means the block in question is coded; if the allotted bit is "0," the block in question is not coded.

In the case of the 4:2:2 format, the coded block pattern information "coded_block_pattern_420" is supplemented with two-bit-wide "coded_block_pattern_1." This means that on the MSB side of "coded_block_pattern_420," a bottom block of color difference Cr and a bottom block of color difference Cb are additionally allotted in the order shown in FIG. 5B.

In the case of the 4:4:4 format, the coded block pattern information "coded_block_pattern_420" is supplemented with six-bit-wide "coded_block_pattern_2." This means that on the MSB side of "coded_block_pattern_420," a bottom left block of color difference Cr, a bottom left block of color difference Cb, a top right block of color difference Cr, a top right block of color difference Cb, a bottom right block of color difference Cr, and a bottom right block of color difference Cb are additionally allotted in the order shown in FIG. 5C.

[Relations Between a Macro Block and its Blocks]

Figures 8A, 8B, 8C:
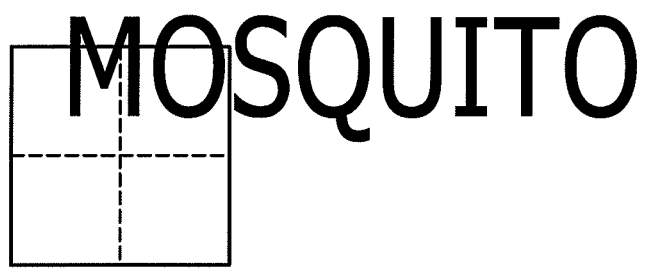
FIGS. 8A, 8B and 8C are schematic views showing relations between a macro block and its blocks assumed for the embodiment.

FIGS. 8A, 8B and 8C are schematic views showing the relations between a macro block and its blocks assumed for the embodiment of this invention. Generally, the noise such as mosquito noise caused by irreversible compression stems primarily from the deletion of data through quantization. According to MPEG-2, the quantization scale serving as a quantization level may be used to determine how much data has been deleted. Mosquito noise typically occurs around characters or fine textures. For this reason, the macro block in which the mosquito noise appears is expected to grow in image complexity. That is, the amount of the code generated in the macro block is expected to increase.

Meanwhile, mosquito noise occurs in processing units of DCT, i.e., in units of orthogonal transformation. For this reason, it is preferred that each of the blocks within the macro block be checked for mosquito noise. However, the quantization scale and the generated code amount of each macro block of interest are handled in units of such a macro block. Thus if only some of the blocks within the macro block contain mosquito noise as shown in FIG. 8A, that means blocks of large code amounts coexist with blocks of small code amounts as indicated in FIG. 8B. If the quantization scale and generated code amount of an entire macro block are referenced to detect mosquito noise, then these values are simply averaged within the macro block and may not lead to the appropriate detection of mosquito noise. It should be noted that the pixel blocks of brightness are assumed for the explanation herein.

As can be seen from FIGS. 8B and 8C, there is a correlation between the amount of generated code and the coded or uncoded state of each block. With this correlation taken into account, the embodiment of the invention assigns weights to the product of multiplying the quantization scale by the amount of generated code in the macro block of interest through the use of the above-mentioned coded block pattern information. This arrangement is intended to prevent an oversight of mosquito noise and to implement more adaptive noise detection.

Also, the quantization scale and the amount of generated code in the macro block of interest vary depending on the type of the picture to be decoded. There are three picture types: I-picture, P-picture, and B-picture, each of which corresponds to the predictive coding scheme in effect. The I-picture is a picture coded only from the information within the picture and generated without recourse to inter-frame prediction. The P-picture is a picture generated through prediction from an I-picture or P-picture. The reference direction for an inter-frame prediction picture is the forward direction. The B-picture is a picture generated through bidirectional prediction. The reference direction for an inter-frame prediction picture in this case is both the forward direction and the backward direction. According to the embodiment, the result of the detection is weighted depending on the picture type in order to boost the accuracy of detection.

That is, the product C0 of multiplication of the quantization scale by the generated code amount is weighted based on the coded block pattern information in effect so as to find a value C1. The value C1 is further weighted by picture type to calculate a value C2. The value C2 serves as the noise occurrence indicator indicative of mosquito noise. Comparing the noise occurrence indicator with predetermined threshold values determines whether or not the smoothing process needs to be effected to reduce mosquito noise, as well as such parameters as the smoothing coefficient for the smoothing process and edge detection levels. The higher the noise occurrence indicator, the larger the parameters according to which the mosquito noise filter module 200 reinforces the noise reduction process.

[Parameter Setting Operation Example]

FIG. 9 is a flowchart of steps constituting an operation example in which the decoding apparatus 100 as the first embodiment of the invention sets parameters. In step S900, the variable length decoding block 110 acquires per macro block the decoding information necessary for decoding from the bit stream supplied onto a signal line 101. The decoding information illustratively includes the quantization scale, generated code amount, coded block pattern information, and picture type. The setting "quantiser_scale_code" of the macro block shown in FIG. 6 may be used as the quantization scale. The generated code amount may be derived from the variable length decoding process carried out by the variable length decoding block 110. The setting "coded_block_pattern( )" of the macro block shown in FIG. 6 may be utilized as the coded block pattern information. A setting "picture_coding_type" under "picture_header ( )" not shown, may be used as the picture type.

In step S901, the mosquito noise occurrence indicator generation block 180 multiplies the quantization scale by the generated code amount (i.e., coded bit count) from the decoding information to find the value C0. In step S910, the mosquito noise occurrence indicator generation block 180 weights the value C0 based on the coded block pattern information to give the value C1. The weighting is accomplished by multiplying the value C0 by a weight "cbp_rate" obtained using the procedure to be discussed later.

In step S902, the mosquito noise occurrence indicator generation block 180 weights the value C1 based on the picture type to find the value C2 as the mosquito noise occurrence indicator. Illustratively, the weight of the picture type (type_rate) may be "1" (no weight) for the I-picture, "1.5" for the P-picture, and "2" for the B-picture.

Given the noise occurrence indicator C2 thus acquired, the parameter setting block 190 may illustratively assume three threshold values: Det_th1, Det_th2, and Det_th3 as the parameters for the mosquito noise filter module 200. It is further assumed that Det_th1<Det_th2<Det_th3.

If in step S903 the noise occurrence indicator C2 is found to be smaller than the threshold value "Det_th1," then mosquito noise is considered practically nonexistent and a flag "filter_off_flg" is set to "1" in step S904. This causes the pixel selection block 250 to select the pixel data not processed by the smoothing process block 230.

If in step S905 the noise occurrence indicator C2 is found to be equal to or larger than the threshold value "Det_th1" and smaller than the threshold value "Det_th2," then the flag "filter_off_flg" is set to "0" (smoothing process required) in step S906. In this case, the edge detection level kh2 and the smoothing coefficient k2 are set to be relatively low in step S906.

If in step S907 the noise occurrence indicator C2 is found to be equal to or larger than the threshold value "Det_th2" and smaller than the threshold value "Det_th3," the flag "filter_off_flg" is set to "0" in step S908. In this case, the edge detection level kh3 and the smoothing coefficient k3 are set to be intermediate in step S908.

If in step S907 the noise occurrence indicator C2 is found to be equal to or larger than the threshold value "Det_th3," then the flag "filter_off_flg" is set to "0" in step S909. In this case, the edge detection level kh4 and the smoothing coefficient k4 are set to be relatively high in step S909.

That is, the higher the noise occurrence indicator C2, the higher the smoothing coefficient according to which the mosquito noise filter module 200 reinforces the noise reduction process. Also, the higher the noise occurrence indicator C2, the higher the level set for edge detection. In this manner, the process for reducing mosquito noise is carried out in keeping with the noise occurrence indicator C2. If the noise occurrence indicator C2 turns out to be significantly low, then the smoothing process itself is suppressed.

Illustratively, typical smoothing coefficients may be set to be k2=1:2:1, k3=2:3:2, and k4=1:1:1. Also, typical edge detection levels may be set to be kh2=60, kh3=70, and kh4=80.

Figure 10:
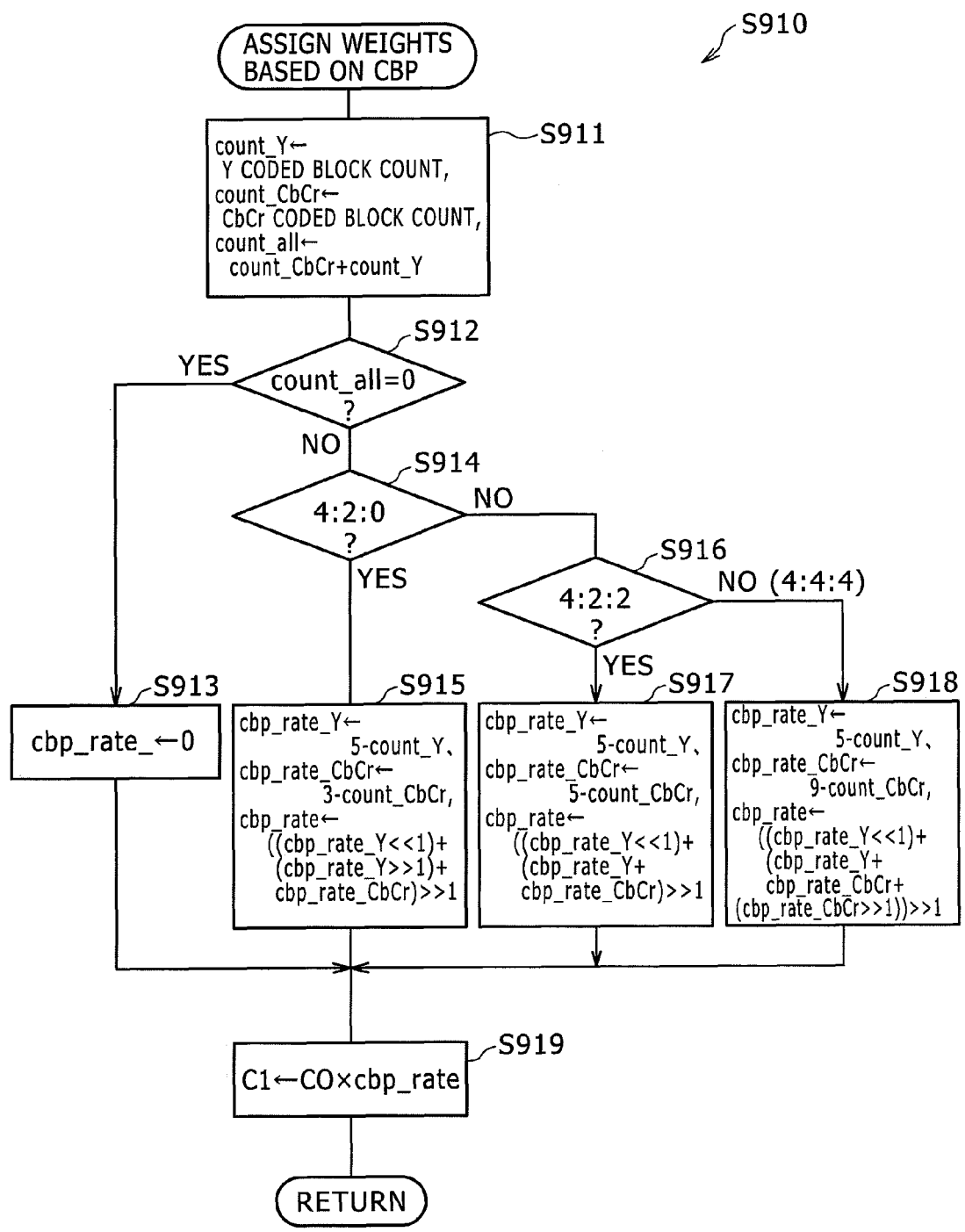
FIG. 10 is a flowchart of steps constituting a weighting process (step S910 in FIG. 9) performed by the embodiment as a first operation example based on the coded block pattern information.

FIG. 10 is a flowchart of steps constituting a weighting process (step S910 in FIG. 9) performed by the embodiment as the first operation example based on the coded block pattern information. As explained above in reference to FIGS. 5A through 5C, the coded block pattern information included in the decoding information holds one-bit data indicating the coded or uncoded state of brightness and color difference components regarding the blocks within the macro block. In step S911, the coded block count for brightness Y is set to a variable "count_Y" and the coded block count for color differences Cr and Cb is set to a variable "count_CbCr" in the coded block pattern information. Also, the sum of the variables "count_Y" and "count_CbCr" is set to a variable "count_all" in step S911.

If in step S912 the variable "count_all" is found to be "0," i.e., if no coded block is found to exist within the macro block, then the weight "cbp_rate" based on the coded block pattern information is set to "0" in step S913. If in step S912 the variable "count_all" is not found to be "0," the weight "cbp_rate" based on the coded block pattern information is set according to the format of the sampling frequency rates in effect.

If the format is found to be "4:2:0" in step S914, then weights "cbp_rate_Y" and "cbp_rate_CbCr" are first calculated in step S915 with regard to brightness Y and color difference Cb using the following expressions:

$$cbp\_rate\_Y = 5 - count\_Y$$

$$cbp\_rate\_CbCr = 3 - count\_CbCr$$

The results of the calculations above are combined to obtain the weight "cbp_rate" based on the coded block pattern information in step S915. That is, $$cbp\_rate = ((cbp\_rate\_Y << 1) + (cbp\_rate\_Y >> 1) + cbp\_rate\_CbCr) >> 1$$

Since the information including the radio frequency components that may cause noise tends to be on the brightness side, the sampling frequency rates are varied so that the weight on brightness Y is made larger than the weight on color differences Cb and Cr. The same formula is applied to the other formats as well.

If the format is found to be "4:2:2" in step S916, the weights "cbp_rate_Y" and "cbp_rate_CbCr" are first calculated in step S917 with regard to brightness Y and color difference Cb using the following expressions:

$$cbp\_rate\_Y = 5 - count\_Y$$

$$cbp\_rate\_CbCr = 5 - count\_CbCr$$

The results of the calculations above are combined to obtain the weight "cbp_rate" based on the coded block pattern information in step S917. That is, $$cbp\_rate = ((cbp\_rate\_Y << 1) + (cbp\_rate\_Y + cbp\_rate\_CbCr)) >> 1$$

If the format is found to be "4:4:4" in step S916, the weights "cbp_rate_Y" and "cbp_rate_CbCr" are first calculated in step S918 with regard to brightness Y and color difference Cb using the following expressions:

$$cbp\_rate\_Y = 5 - count\_Y$$

$$cbp\_rate\_CbCr = 9 - count\_CbCr$$

The results of the calculations above are combined to obtain the weight "cbp_rate" based on the coded block pattern information in step S918. That is, $$cbp\_rate = ((cbp\_rate\_Y << 1) + (cbp\_rate\_Y + cbp\_rate\_CbCr + (cbp\_rate\_CbCr >> 1))) >> 1$$

After the weight "cbp_rate" based on the coded block pattern information is calculated as described above according to the format, the product C0 of multiplication of the quantization scale by the generated code amount is multiplied by the weight "cbp_rate" in step S919. The product of this multiplication is the value C1.

In the first operation example of the weighting process based on the coded block pattern information, the calculations involved are complex because of the need to vary the rates with brightness Y and with color differences Cb and Cr. Some processors with lesser performance may find the operations too onerous to accomplish adequately. Below is a description of a second operation example that simplifies the weighting process.

Figure 11:
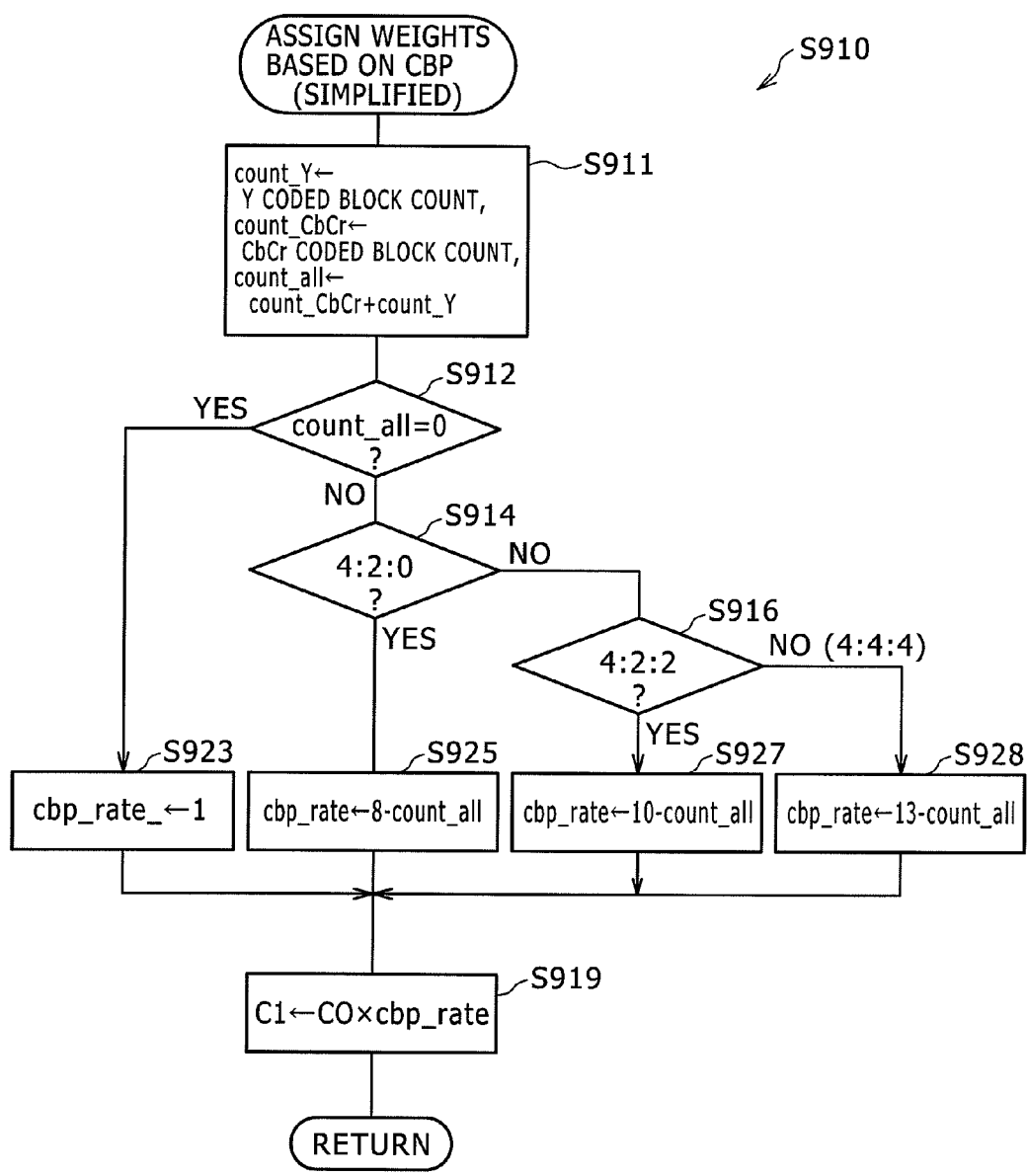
FIG. 11 is a flowchart of steps constituting the weighting process (step S910) performed by the embodiment as a second operation example based on the coded block pattern information.

FIG. 11 is a flowchart of steps constituting the weighting process (step S910) performed by the embodiment as the second operation example based on the coded block pattern information. In the second operation example, as in the first example, the coded block counts are first calculated in step S911.

If the variable "count_all" is found to be "0" in step S912, i.e., if no coded block is found to exist within the macro block, then the weight "cbp_rate" based on the coded block pattern information is set to "1" in step S923. If in step S912 the variable "count_all" is not found to be "0," the weight "cbp_rate" based on the coded block pattern information is set according to the format of the sampling frequency rates as in the first operation example.

If the format is found to be "4:2:0" in step S914, then the weight "cbp_rate" based on the coded block pattern information is calculated in step S925 using the following expression:

cbp_rate=8−count_all

If the format is found to be "4:2:2" in step S916, then the weight "cbp_rate" based on the coded block pattern information is calculated in step S927 using the following expression:

cbp_rate=10−count_all

If the format is found to be "4:4:4" in step S916, then the weight "cbp_rate" based on the coded block pattern information is calculated in step S928 using the following expression:

cbp_rate=13−count_all

After the weight "cbp_rate" based on the coded block pattern information is calculated as described above according to the format, the product C0 of multiplication of the quantization scale by the generated code amount is multiplied by the weight "cbp_rate" in step S919. The product of this multiplication is the value C1. If this simplified method is used to calculate the weight "cbp_rate," it is preferred that the threshold values "Det_th1," "Det_th2" and "Det_th3" and the edge detection levels "kh2," "kh3" and "kh4" be set so as to bring about excessive detection intentionally and thereby maintain consistency.

[Operation Example of the Noise Reduction Process]

Figure 12:
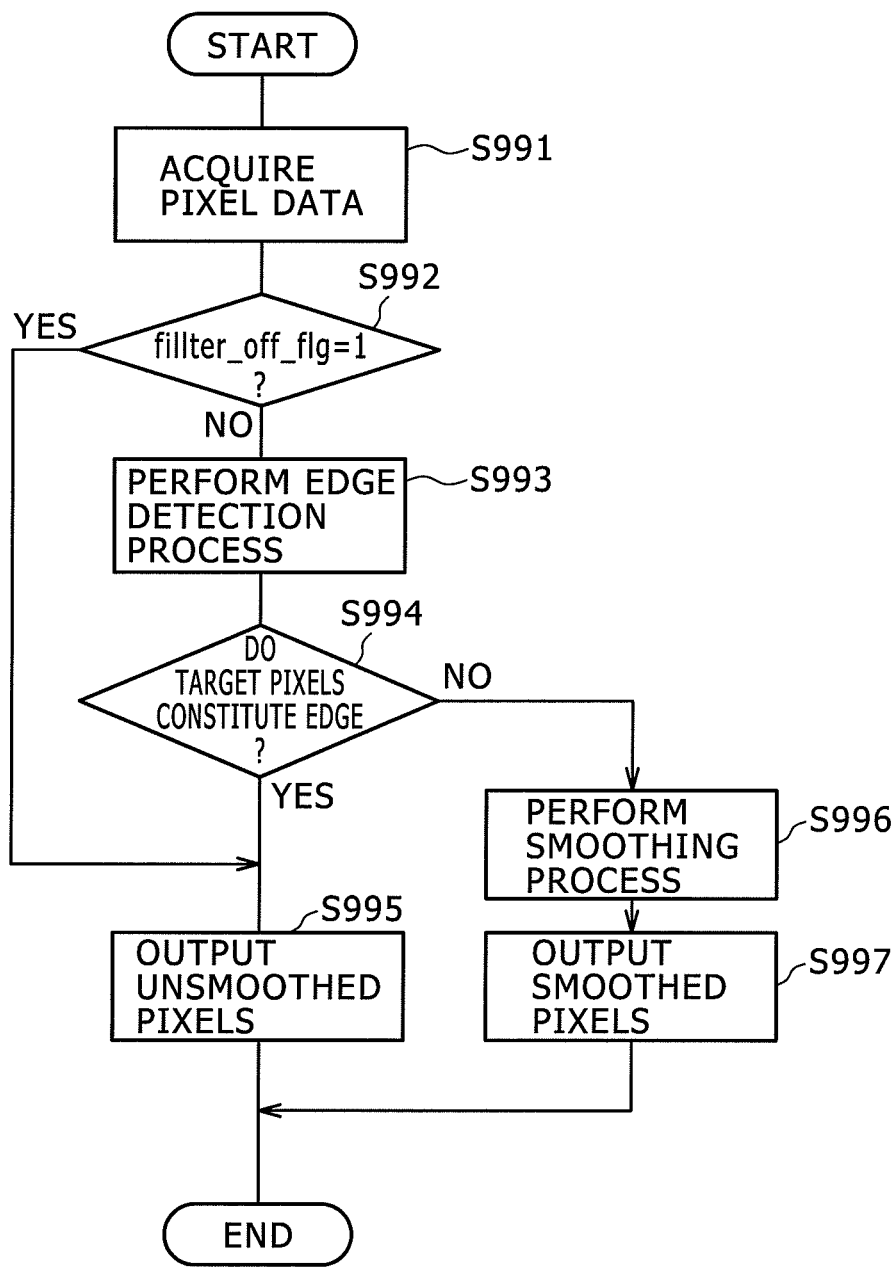
FIG. 12 is a flowchart of steps constituting an operation example in which a noise reduction process is performed by the decoding apparatus as the first embodiment of the invention.

FIG. 12 is a flowchart of steps constituting an operation example in which the noise reduction process is performed by the decoding apparatus 100 as the first embodiment of the invention. After the parameters have been set by the operations discussed above, the process for reducing mosquito noise is performed by the mosquito noise filter module 200. In step S991, the pixel selection block 210 acquires from the peripheral pixel register 220 nine-pixel data composed of three lines by three pixels, as well as the pixel to be processed which has been forwarded over the signal line 179 and the peripheral pixels around it. The acquired pixels are fed to the smoothing process block 230 and edge detection block 240. If in step S992 the flag "filter_off_flg" is found to be "1," the pixel selection block 250 outputs unsmoothed pixel data (i.e., target pixel data selected by the pixel selection block 210) in step S995.

If in step S992 the flag "filter_off_flg" is found to be "0," then the edge detection block 240 performs an edge detection process in step S993. If in step S994 an edge is detected from the pixel data to be processed, the pixel selection block 250 outputs the unsmoothed pixel data in step S995 in the same manner as when the flag "filter_off_flg" turns out to be "1."

If in step S994 no edge is detected from the pixel data to be processed, then the smoothing process block 230 performs the smoothing process in step S996. In step S997, the pixel selection block 250 outputs the smoothed pixel data.

According to the first embodiment of the invention, the mosquito noise occurrence indicator C2 is generated as described above based on the decoding information including the coded block pattern information. The noise occurrence indicator C2 is used to set the parameters for the mosquito noise filter module 200. It follows that in keeping with the coded state of each of the blocks within the macro block, it is possible to adjust the intensity of the noise reduction process performed by the mosquito noise filter module 200.

2. Second Embodiment

It is common knowledge that if there are large motions in compression-coded images, the correlation between the images is low and coding efficiency is worsened. Generally, the incidence of noise in images with large motions is high. That is because the code amount in such images is reduced upon coding so that the quantization scale is set to be larger for these images with larger motions than for the images with smaller motions. According to the second embodiment of the invention, motion information is utilized in such a manner as to boost the accuracy of mosquito noise detection.

As explained above in reference to FIG. 6, the macro block contains information about the motion vector. From this motion vector information, one of horizontal prediction, vertical prediction, forward/backward prediction, and dual prime prediction is determined and the absolute value of the amount of motion in the macro block is generated accordingly. The absolute value of the amount of motion is generated by the mosquito noise occurrence indicator generation block 180 or by the parameter setting block 190 and used by the latter block. The circuit structure may be the same as that of the first embodiment. The absolute value of the amount of motion is an example of the motion information described in the appended claims.

[Parameter Setting Operation Example]

Figure 13:
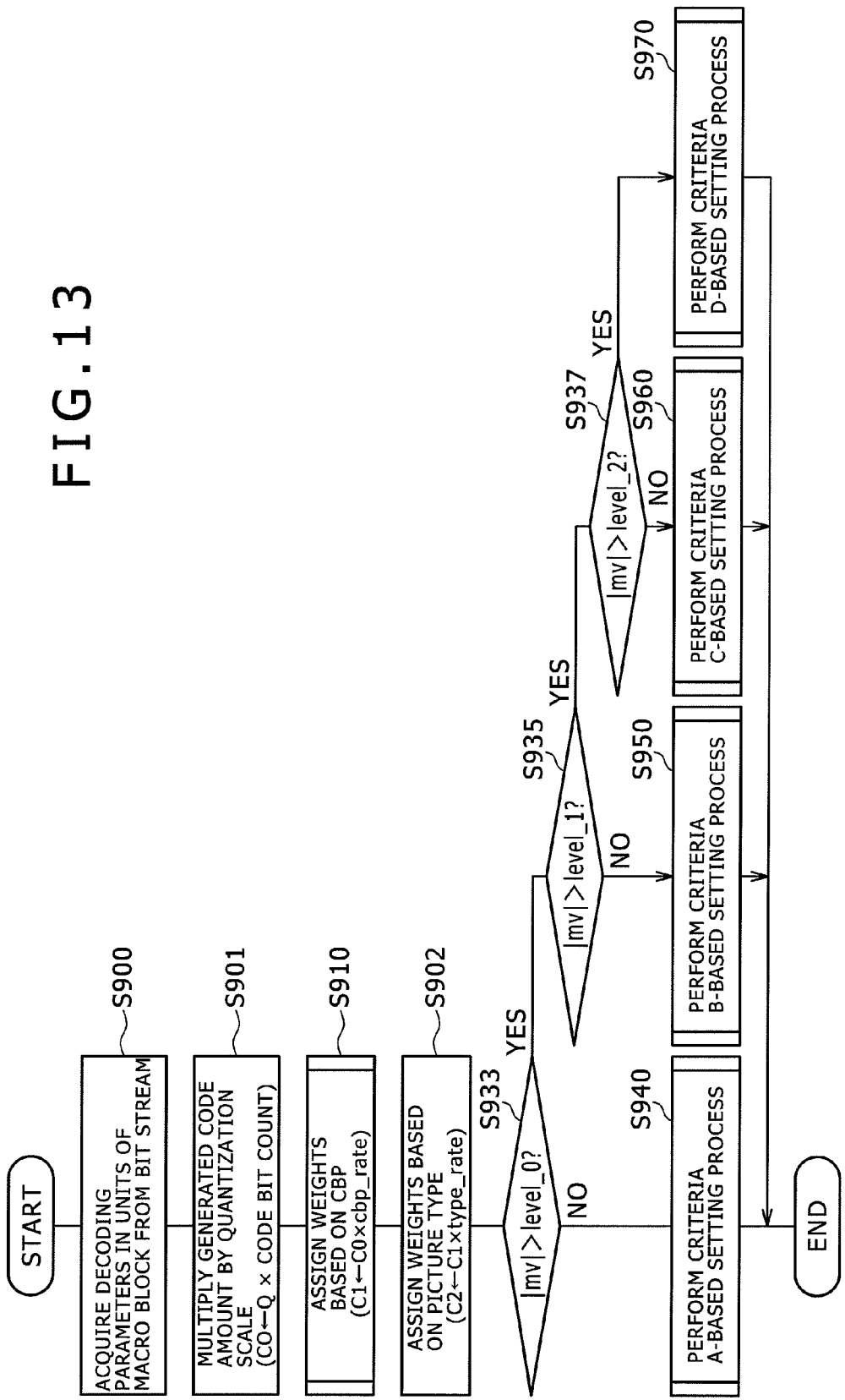
FIG. 13 is a flowchart of steps constituting an operation example in which the decoding apparatus as a second embodiment of the invention sets parameters.

FIG. 13 is a flowchart of steps constituting an operation example in which the decoding apparatus 100 as the second embodiment of the invention sets parameters. Steps S900 through S902 are the same as those for the first embodiment described above in reference to FIG. 9. After the mosquito noise occurrence indicator C2 is acquired, the mosquito noise occurrence indicator generation block 180 or parameter setting block 190 takes, say, three threshold values "level 0," "level 1" and "level 2" into consideration regarding the absolute value of the amount of motion |mv|. It is assumed that level 0<level 1<level 2.

If in step S933 the absolute value of the amount of motion |mv| is found to be equal to or smaller than the threshold value "level 0," then a parameter setting process is performed based on criteria A in step S940. If in step S935 the absolute value of the amount of motion |mv| is found to be larger than the threshold value "level 0" and equal to or smaller than the threshold value "level 1," the parameter setting process is performed based on criteria B in step S950. If in step S937 the absolute value of the amount of motion |mv| is found to be larger than the threshold value "level 1" and equal to or smaller than the threshold value "level 2," the parameter setting process is performed based on criteria C in step S960. If in step S937 the absolute value of the amount of motion |mv| is found to be larger than the threshold value "level 2," then the parameter setting process is performed based on criteria D in step S970.

That is, the larger the absolute value of the amount of motion |mv|, the more reinforced the noise reduction process performed by the mosquito noise filter module 200.

FIGS. 14 through 17 are flowcharts constituting the parameter setting processes (steps S940, S950, S960, and S970 in FIG. 13) performed by the second embodiment as operation examples based on criteria A through D, respectively. Apart from the relations between threshold values and parameters, the detailed steps involved in each of the processes are the same. For this reason, the parameter setting process shown in FIG. 14 will be explained below as the representative example.

Figure 14:
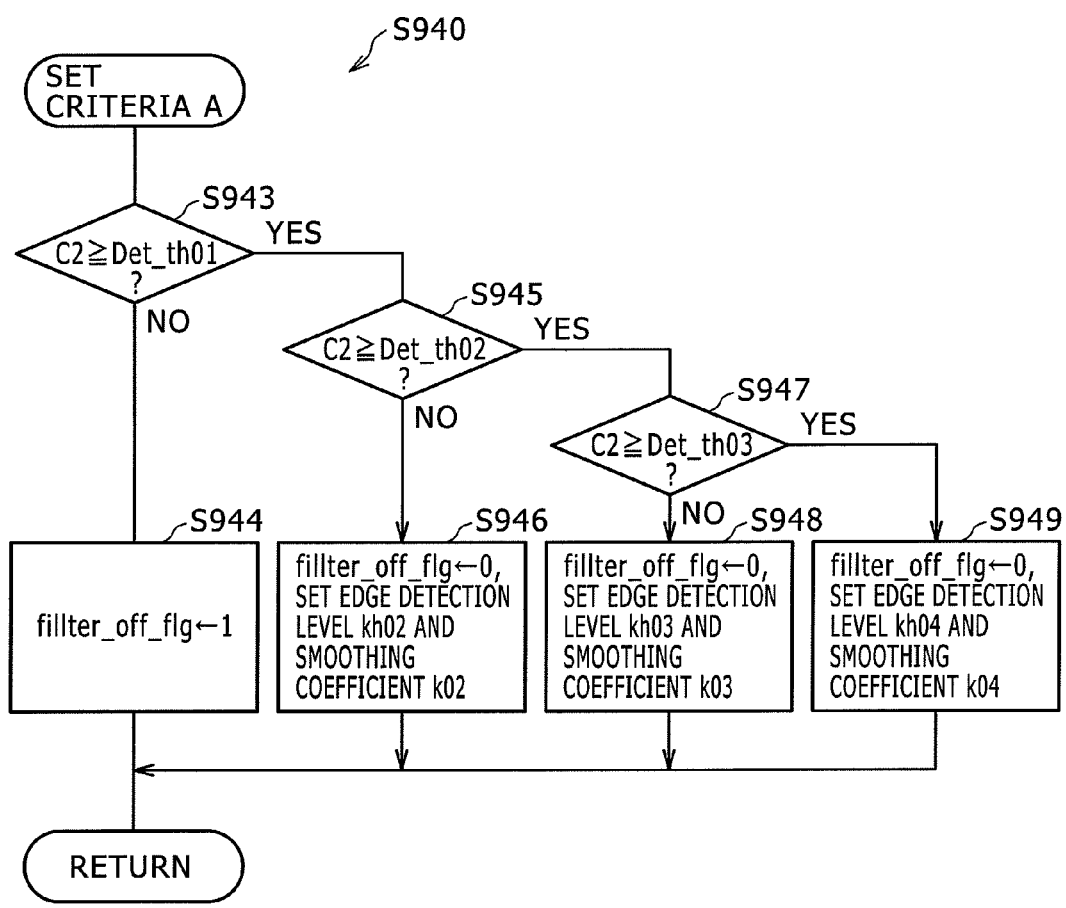
FIG. 14 is a flowchart of steps constituting a parameter setting process (step S940 in FIG. 13) performed by the second embodiment as an operation example based on criteria A.
Figure 15:
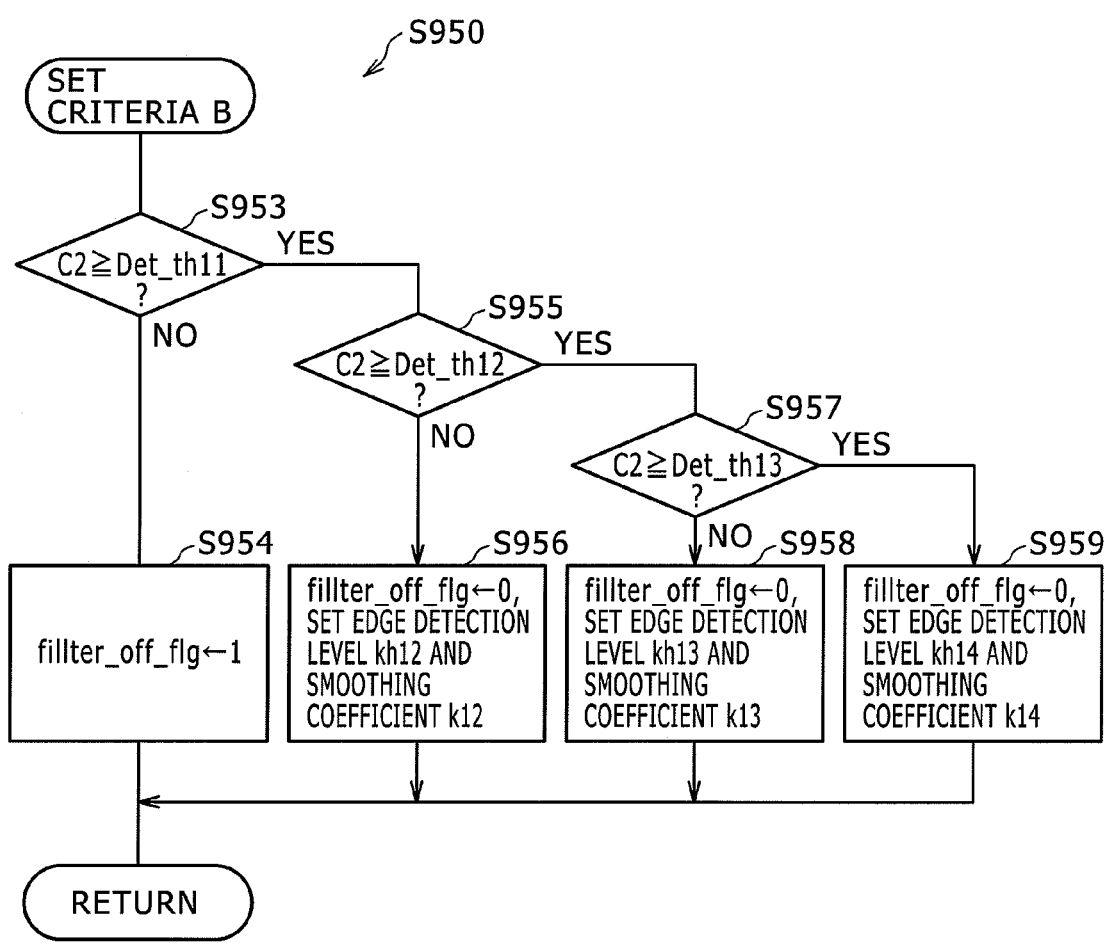
FIG. 15 is a flowchart of steps constituting another parameter setting process (step S950 in FIG. 13) performed by the second embodiment as another operation example based on criteria B.
Figure 16:
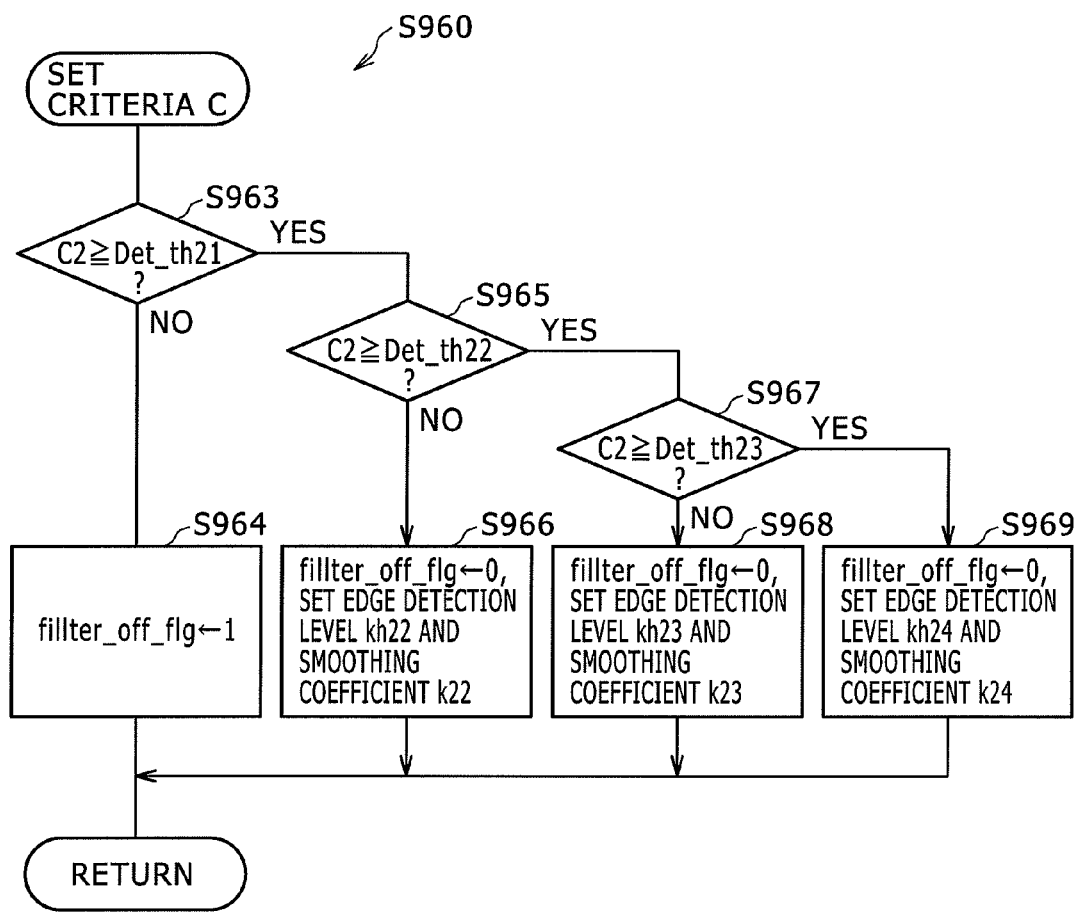
FIG. 16 is a flowchart of steps constituting another parameter setting process (step S960 in FIG. 13) performed by the second embodiment as another operation example based on criteria C.
Figure 17:
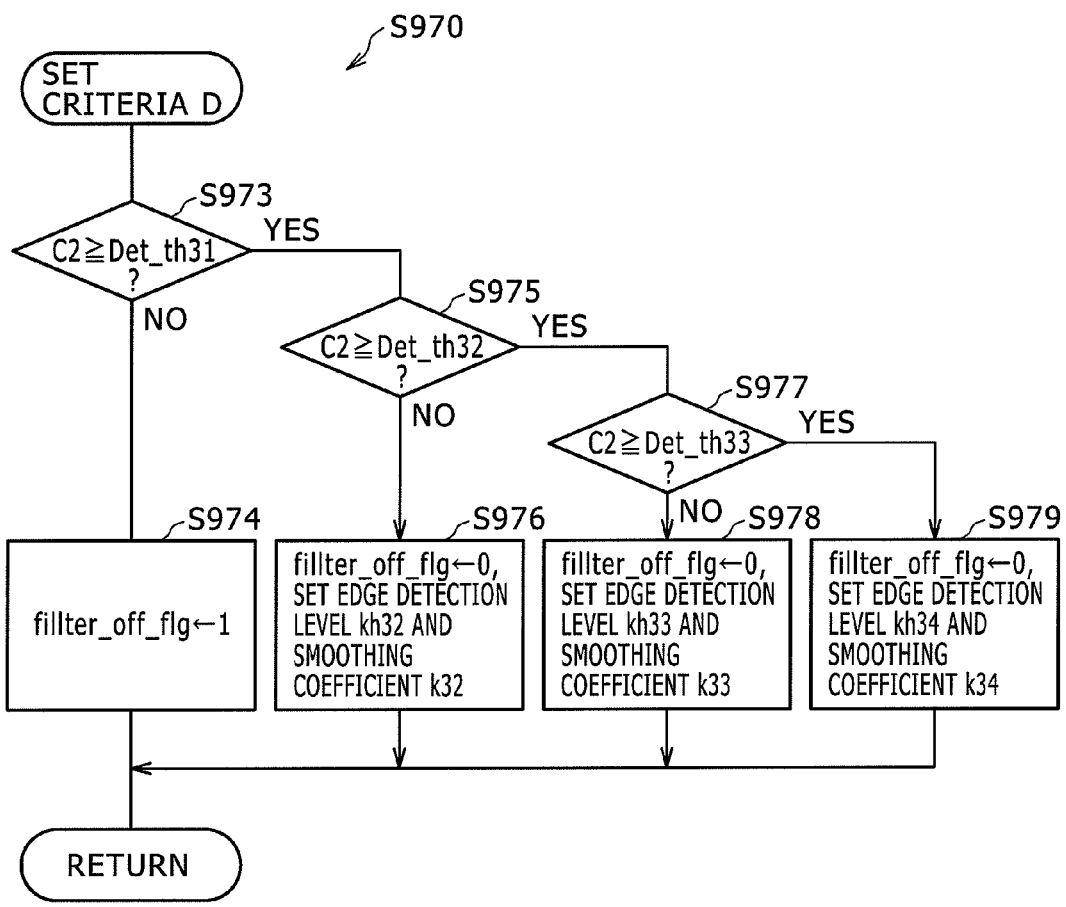
FIG. 17 is a flowchart of steps constituting another parameter setting process (step S970 in FIG. 13) performed by the second embodiment as another operation example based on criteria D.

In step S943 of FIG. 14, if the noise occurrence indicator C2 is found to be smaller than a threshold value Det_th01, then mosquito noise is considered practically nonexistent and the flag "filter_off_flg" is set to "1" in step S944 indicating that the smoothing process is not needed. This causes the pixel selection block 250 to select the pixel data not smoothed by the smoothing process block 230.

If in step S945 the noise occurrence indicator C2 is found to be equal to or larger than the threshold value Det_th01 and smaller than a threshold value Det_th02, the flag "filter_off_ flg" is set to "0" in step S946 indicating that the smoothing process is needed. Also in step S946, the edge detection level kh02 and smoothing coefficient k02 are set to be relatively low compared with the settings to be made in step S948 or S949.

If in step S947 the noise occurrence indicator C2 is found to be equal to or larger than the threshold value Det_th02 and smaller than a threshold value Det_th03, the flag "filter_off_ flg" is set to "0" in step S948. Also in step S948, the edge detection level kh03 and smoothing coefficient k03 are set to be approximately intermediate between the settings made in steps S946 and S949.

If in step S947 the noise occurrence indicator C2 is found to be equal to or larger than the threshold value Det_th03, then the flag "filter_off_flg" is set to "0" in step S949. Also in step S949, the edge detection level kh04 and smoothing coefficient k04 are set to be relatively high compared with the settings made in steps S946 and S948.

That is, under criteria A, the smoothing coefficient is set so that the higher the noise occurrence indicator C2, the more reinforced the smoothing process performed by the mosquito noise filter module 200. Also, the higher the noise occurrence indicator C2, the higher the level set for edge detection. In this manner, the process for reducing mosquito noise is carried out in keeping with the mosquito noise occurrence indicator C2. If the noise occurrence indicator C2 turns out to be significantly low, then the smoothing process itself is suppressed.

Under criteria B, the smoothing coefficient is set so that, as a whole, the higher the noise occurrence indicator C2, the more reinforced the smoothing process performed by the mosquito noise filter module 200 in a manner even more intensive than under criteria A. Also under criteria B, the higher the noise occurrence indicator C2, the higher the level set for edge detection. Under criteria C, the smoothing coefficient is set so that, on the whole, the higher the noise occurrence indicator C2, the more reinforced the smoothing process performed by the mosquito noise filter module 200 in a manner still more intensive than under criteria B. Also under criteria C, the higher the noise occurrence indicator C2, the higher the level set for edge detection. Under criteria D, the smoothing coefficient is set so that, altogether, the higher the noise occurrence indicator C2, the more reinforced the smoothing process performed by the mosquito noise filter module 200 in a manner yet more intensive than under criteria C. Also under criteria D, the higher the noise occurrence indicator C2, the higher the level set for edge detection.

According to the second embodiment, the parameters for the mosquito noise filter module 200 are set by taking the absolute value of the amount of motion |mv| into consideration as described above. This makes it possible to adjust the intensity of the noise reduction process performed by the mosquito noise filter module 200 in accordance with the coded state and the absolute value of the amount of motion regarding each of the blocks within the macro block.

3. Variations

The first and the second embodiments of the present invention discussed above are merely examples and not limitative of the invention. For example, although the smoothing coefficient and the edge detection level are each divided into three values for the embodiments above, the number of the divided values may be varied as desired.

Whereas the product of multiplication of the quantization scale by the generated code amount is taken as C0 for the above embodiments, either the quantization scale or the generated code amount may be regarded as C0 instead. Whereas the value obtained by having the value C1 weighted by picture type is used as the noise occurrence indicator C2 for the embodiments above, the value C1 may be used instead as the noise occurrence indicator without being weighted by picture type.

Although the second embodiment above was shown utilizing the absolute value of the amount of motion as the motion information, this is not limitative of the invention. Alternatively, the smoothing coefficient and the edge detection level may be varied depending not only on the absolute value of the amount of motion but also on whether the direction of prediction is within the screen of interest (intra-screen) or between screens (inter-screen).

The embodiments above were explained in connection with use examples according to MPEG-2. The present invention may be implemented in like manner as long as the decoding information corresponding to the coded block pattern information can be used under any coding scheme other than MPEG-2.

The above embodiments were described with emphasis on the deletion of mosquito noise. Such mosquito noise is often generated near subtitles or telop characters included in images. In other words, if the technique for detecting mosquito noise discussed above in conjunction with the embodiments is in effect, the mosquito noise occurrence indicator C2 may be used as an indicator indicative of subtitles or telop characters so as to extract the image area containing these subtitles or telop characters. For this feature to go into effect, it may be appropriate to adjust the criteria for subtitle or telop detection based on the motion information in the decoding information and on the quantization noise occurrence indicator. For example, fixed subtitles or telop characters can be identified as such by the absence of any amount of motion in the motion information and of any differential in motion. Telop characters moving horizontally at a constant speed on the screen can be identified when an amount of horizontal motion is found in the motion information but there is no differential in motion. Subtitles or the like scrolled vertically at a constant speed can be identified by the presence of vertical motion in the motion information and by the absence of differential in motion. While the noise in the area of subtitles or telop characters may be deleted by the above-described technique for mosquito noise removal, it is also conceivable to transcode the subtitle or telop character area for the same purpose. That is, using the techniques discussed in conjunction with the embodiments of this invention, it is possible to extract the area containing subtitles or telop characters and transcode the extracted area to attain higher image quality.

The embodiments and their variations described above are merely examples in which the present invention may be implemented. As is clear from above, the particulars of the embodiments and their variations in the description of the preferred embodiments correspond basically to the inventive matters claimed in the appended claims. Likewise, the inventive matters named in the appended claims correspond basically to the particulars with the same names in the description of the preferred embodiments. However, these embodiments and their variations and other examples of the present invention are not limitative thereof, and it should be understood by those skilled in the art that various modifications, combinations, sub-combinations and alterations may occur depending on design requirements and other factor in so far as they are within the scope of the appended claims or the equivalents thereof.

The series of steps and processes discussed above as part of the embodiments of the present invention may be construed as methods for carrying out such steps and processes, as programs for causing a computer to execute such methods, or as recording media that store such programs. The recording media may typically include CD (Compact Disc), MD (Mini-Disc), DVD (Digital Versatile Disk), memory cards, or Blu-ray Disc (registered trademark of Sony Corporation).

The present application contains subject matter related to that disclosed in Japanese Priority Patent Application JP 2009-257603 filed with the Japan Patent Office on Nov. 11, 2009, the entire content of which is hereby incorporated by reference.

What is claimed is:

1. A decoding apparatus, comprising:
a decoding information acquisition block configured to acquire decoding information necessary for decoding in units of a macro block from coded data;
a decoding block, directly connected to an output of the decoding information acquisition block, the decoding block configured to decode said coded data into decoded data based on said decoding information;
a quantization noise filter block, directly connected to an output of the decoding block, the quantization noise filter block configured to perform a noise reduction process on said decoded data for reducing a predetermined quantization noise per macro block;
a quantization noise occurrence indicator generation block, directly connected to an output of said decoding information acquisition block, the quantization noise occurrence indicator generation block configured to generate, based on said decoding information, a noise occurrence indicator indicative of said predetermined quantization noise in a manner reflecting a coded state of each of the blocks constituting said macro block, wherein said quantization noise occurrence indicator generation block generates said noise occurrence indicator by use of coded block pattern information found in said decoding information and indicating whether each of said blocks is coded, wherein said quantization noise occurrence indicator generation block acquires, from said coded block pattern information, a number of coded blocks within said macro block for each of brightness and color difference components and generates said noise occurrence indicator based on the acquired number of said coded blocks for each of said brightness and color difference components; and
a parameter setting block, directly connected to an output of the quantization noise occurrence indicator generation block and directly connected to an input of the quantization noise filter block, the parameter setting block configured to set parameters for said quantization noise filter block based on said noise occurrence indicator.

2. The decoding apparatus according to claim 1, wherein said quantization noise occurrence indicator generation block generates said noise occurrence indicator by use of a number obtained by first multiplying a generated code amount by a quantization scale found in said decoding information and by further weighting the product of the multiplication based on said coded block pattern information.

3. The decoding apparatus according to claim 2, wherein said quantization noise occurrence indicator generation block generates said noise occurrence indicator by use of the number obtained by first weighting the product of the multiplication based on said coded block pattern information and by further weighting the weighted product based on a picture type found in said decoding information.

4. The decoding apparatus according to claim 1, wherein said parameter setting block sets said parameters in such a manner that the larger said noise occurrence indicator, the more reinforced said noise reduction process to be performed by said quantization noise filter block.

5. The decoding apparatus according to claim 1, further comprising:
an edge detection block configured to detect an edge image included in said decoded data,
wherein said quantization noise filter block does not perform said noise reproduction process on the macro block from which said edge image is detected by said edge detection block.

6. The decoding apparatus according to claim 1, wherein said parameter setting block sets said parameters based on motion information found in said decoding information and on said noise occurrence indicator generated by said quantization noise occurrence indicator generation block.

7. The decoding apparatus according to claim 6, wherein said parameter setting block sets said parameters in such a manner that the larger the motion represented by said motion information, the more reinforced said noise reduction process to be performed by said quantization noise filter block.

8. The decoding apparatus according to claim 1, wherein said predetermined quantization noise is mosquito noise; and
wherein said quantization noise filter block performs a smoothing process as said noise reduction process for reducing said mosquito noise.

9. The decoding apparatus according to claim 1, wherein said noise occurrence indicator is an indicator indicative of the presence of either subtitles or telop characters in an image; and
wherein said quantization noise filter block performs a smoothing process as said noise reproduction process for reducing the noise in an image area where either said subtitles or said telop characters are present.

10. A decoding control apparatus comprising:
a decoding information acquisition block configured to acquire decoding information necessary for decoding in units of a macro block from coded data;
a quantization noise occurrence indicator generation block, connected directly to an output of the decoding information acquisition block, the quantization noise occurrence indicator block configured to generate, based on said decoding information, a noise occurrence indicator indicative of a predetermined quantization noise in a manner reflecting a coded state of each of the blocks constituting said macro block, wherein said quantization noise occurrence indicator generation block generates said noise occurrence indicator by use of coded block pattern information found in said decoding information and indicating whether each of said blocks is coded, wherein said quantization noise occurrence indicator generation block acquires, from said coded block pattern information, a number of coded blocks within said macro block for each of brightness and color difference components and generates said noise occurrence indicator based on the acquired number of said coded blocks for each of said brightness and color difference components; and
a parameter generation block connected directly to an output of the quantization noise occurrence indicator, the parameter generation block configured to generate, based on said noise occurrence indicator, parameters for use in a noise reduction process for reducing said predetermined quantization noise.

11. A decoding method for a decoding apparatus including a decoding information acquisition block, a decoding block connected directly to an output of the decoding acquisition block, a quantization noise filter block connected directly to an output of the decoding block, a quantization noise occurrence indicator generation block connected directly to an output of the decoding information acquisition block and a parameter setting block connected directly to an output of the quantization noise occurrence indicator generation block and connected directly to an input of the quantization noise filter block, the decoding method comprising the steps of:
   acquiring decoding information necessary for decoding in units of a macro block from coded data;
   decoding said coded data into decoded data based on said decoding information;
   generating, based on said decoding information, a noise occurrence indicator indicative of a predetermined quantization noise in a manner reflecting a coded state of each of the blocks constituting said macro block, wherein said noise occurrence indicator generated by use of coded block pattern information found in said decoding information and indicating whether each of said blocks is coded, and acquiring from said coded block pattern information, a number of coded blocks within said macro block for each of brightness and color difference components and generating said noise occurrence indicator based on the acquired number of said coded blocks for each of said brightness and color difference components;
   generating, based on said noise occurrence indicator, parameters for use in a noise reduction process for reducing said predetermined quantization noise; and
   performing said noise reduction process on said decoded data per macro block in accordance with said parameter.

12. A program embodied on a non-transitory computer readable medium for causing a computer to execute a procedure for a decoding apparatus including a decoding information acquisition block, a decoding block connected directly to an output of the decoding acquisition block, a quantization noise filter block connected directly to an output of the decoding block, a quantization noise occurrence indicator generation block connected directly to an output of the decoding information acquisition block and a parameter setting block connected directly to an output of the quantization noise occurrence indicator generation block and connected directly to an input of the quantization noise filter block, the decoding method comprising the steps of:
   acquiring decoding information necessary for decoding in units of a macro block from coded data;
   decoding said coded data into decoded data based on said decoding information;
   generating, based on said decoding information, a noise occurrence indicator indicative of a predetermined quantization noise in a manner reflecting a coded state of each of the blocks constituting said macro block, wherein said noise occurrence indicator generated by use of coded block pattern information found in said decoding information and indicating whether each of said blocks is coded, and acquiring, from said coded block pattern information, a number of coded blocks within said macro block for each of brightness and color difference components and generating said noise occurrence indicator based on the acquired number of said coded blocks for each of said brightness and color difference components;
   generating, based on said noise occurrence indicator, parameters for use in a noise reduction process for reducing said predetermined quantization noise; and
   performing said noise reduction process on said decoded data per macro block in accordance with said parameter.

13. A decoding apparatus, comprising:
decoding information acquisition means for acquiring decoding information necessary for decoding in units of a macro block from coded data;
decoding means connected directly to an output of the decoding information acquisition means, the decoding means for decoding said coded data into decoded data based on said decoding information;
quantization noise filter means connected directly to an output of the decoding means, the quantization noise filter means for performing a noise reduction process on said decoded data for reducing a predetermined quantization noise per macro block;
quantization noise occurrence indicator generation means connected directly to an output of said decoding information acquisition means, the quantization noise occurrence indicator generation means for generating, based on said decoding information, a noise occurrence indicator indicative of said predetermined quantization noise in a manner reflecting a coded state of each of the blocks constituting said macro block, wherein said quantization noise occurrence indicator generation means generates said noise occurrence indicator by use of coded block pattern information found in said decoding information and indicating whether each of said blocks is coded, wherein said quantization noise occurrence indicator generation means acquires, from said coded block pattern information, a number of coded blocks within said macro block for each of brightness and color difference components and generates said noise occurrence indicator based on the acquired number of said coded blocks for each of said brightness and color difference components; and
parameter setting means connected directly to an output of the quantization noise occurrence indicator generation means and connected directly to an input of the quantization noise filter means, the parameter setting means for setting parameters for said quantization noise filter means based on said noise occurrence indicator.

14. A decoding control apparatus comprising:
decoding information acquisition means for acquiring decoding information necessary for decoding in units of a macro block from coded data;
quantization noise occurrence indicator generation means connected directly to an output of the decoding means, the quantization noise filter means for generating, based on said decoding information, a noise occurrence indicator indicative of a predetermined quantization noise in a manner reflecting a coded state of each of the blocks constituting said macro block, wherein said quantization noise occurrence indicator generation means generates said noise occurrence indicator by use of coded block pattern information found in said decoding information and indicating whether each of said blocks is coded, wherein said quantization noise occurrence indicator generation mean acquires, from said coded block pattern information, a number of coded blocks within said macro block for each of brightness and color difference components and generates said noise occurrence indicator based on the acquired number of said coded blocks for each of said brightness and color difference components; and parameter generation means connected directly to an output of the quantization noise occurrence indicator generation means and connected to an input of the quantization noise filter means, the parameter setting means for generating, based on said noise occurrence indicator, parameters for use in a noise reduction process for reducing said predetermined quantization noise.

* * * * *